United States Patent [19]

Otteson

[11] 4,188,971
[45] Feb. 19, 1980

[54] FLUID CUTOUT VALVE

[75] Inventor: N. Stuart Otteson, Springfield, Va.

[73] Assignee: The United States of America as represented by the Secretary of the Navy, Washington, D.C.

[21] Appl. No.: 900,470

[22] Filed: Apr. 27, 1978

[51] Int. Cl.² ............................................. F16K 17/34
[52] U.S. Cl. .................................. 137/460; 137/461; 137/462; 137/495; 137/498
[58] Field of Search ............... 137/460, 461, 462, 495, 137/498

[56] References Cited

U.S. PATENT DOCUMENTS

| | | | |
|---|---|---|---|
| 3,368,581 | 2/1968 | Glover | 137/460 |
| 3,400,734 | 9/1968 | Rosenberg | 137/460 X |
| 3,621,873 | 11/1971 | Kenann | 137/460 X |

*Primary Examiner*—Robert G. Nilson
*Attorney, Agent, or Firm*—R. S. Sciascia; Sol Sheinbein

[57] ABSTRACT

A valve disposed in a fluid system for cutting off the flow of fluid from a source of that fluid to a fluid-using environment upon the occurrence of either an excess or unduly high fluid flow rate or an excess pressure condition experienced in or near the environment. An obturator, disposed in a flow chamber between the valve inlet and outlet, is controlled by two independent assemblies which are responsive to either the flow rate through the valve or the pressure downstream of the valve in the environment. A bias spring, part of a cutout obturator assembly and located in the obturator, maintains the obturator in an open position until an excess flow rate promotes a seating of the obturator. A spindle slidingly connects the obturator to a sensing piston assembly so that when an excess pressure condition is experienced in the environment the obturator is pulled into the seated position causing a cessation of fluid flow through the valve and an isolation of the environment from the fluid source.

13 Claims, 4 Drawing Figures

FLUID CUTOUT VALVE

BACKGROUND OF THE INVENTION

The present invention relates generally to cutoff valves, and more particularly to a fluid cuttoff valve for use in fluid systems in which flow is controlled between a source of high pressure and an environment at a reduced pressure such that excess flow rates and excess pressures are not experienced in the environment.

Fluid systems having a fluid supply source and an environment in which the fluid is subjected to a controlled use are old and well known. In some applications the source is at a relatively high pressure, e.g. 3,000 psig and the environment is at a relatively low pressure, e.g. 5 psig, and thus a fluid system necessarily requires a flow control mechanism and/or a pressure reducing station. Such a station might comprise a pressure regulator which ensures that the environment experiences the desired pressure. However, an additional device is usually necessary to protect that portion of the system downstream of the pressure reducing station from excess pressure in the event that the station malfunctions or excess flow in the event of a loss of system integrity, e.g., a pipe or hose bursting between the fluid supply source and the environment.

Devices to protect against excess pressure have traditionally taken the form of relief or safety valves, rupture discs or electrical trip cutout valves. Excess flow rate protection has been accomplished by conventional devices commonly referred to as flow fuzes or pneumatic fuzes. This latter device is exemplified by U.S. Pat. No. 3,621,873, issued to Kenann et al, issued Nov. 23, 1971.

Certain fluid systems require simultaneous protection against the possibility of an excess pressure condition, which results possibly from the malfunction of the regulating or control device, and an excess flow rate condition which is symptomatic of a structural failure in the fluid system boundary. This is particularly true in the fluid systems of submersibles or marine research vessels which handle highly combustible life support fluids such as oxygen and wherein some of the usual methods for disposal or containment of excess fluids are not available. For example, in an oxygen bleed system on a submersible because of the limited and strictly confined environment, there is no feasible alternative for absorbing any excess fluid. Also, discharge outside of the hull of the submersible is usually impractical due to the possibility of detection by unfriendly sensors and because the ambient pressure surrounding the submersible is generally much higher than that within the environment of the submersible.

For these reasons, no relief protection is provided for the above mentioned system and presently malfunctions such as a jammed regulator poppet or a torn sensing diaphragm can result in an overpressure condition producing material damage and injury to personnel. Further, because oxygen is being used, an untoward combustion hazard exists. If there is a fire anywhere in the fluid system, e.g., in the regulator, possibly caused by high velocity throttle impingement, or at some other location downstream in the fluid system, the regulator will open fully because it senses a flow demand. The full opening of the regulator will feed the combustion process by dumping out the entire capacity of the oxygen storage tanks into an area of the submersible where the combustion is occurring. It is clear that the potential for seriously jeopardizing the survival of a submersible is greater by not providing a fluid protection device. A current solution to this problem has been the installation of flow limiting orifice in front of the regulating valve. Unfortunately this is an entirely futile approach because of the range over which the source pressure can vary, e.g., 60 to 3000 psig.

A requirement thus exists for a single fluid cutoff valve which can quickly and reliably respond simultaneously to either an excess pressure or excess flow rate condition in order to isolate a fluid supply from an environment in which the fluid is used.

SUMMARY OF THE INVENTION

Accordingly, it is an object of the present invention to provide a new and improved fluid cutoff valve.

Another object of the present invention is to provide a new and improved cutoff valve which simultaneously responds to an excess pressure and excess flow rate condition.

Still another object of the instant invention is to provide a cutoff valve which responds to either an excess pressure or excess flow rate condition more rapidly than current devices.

A further object of the invention is to provide an improved cutoff valve which can be relatively inexpensive yet very reliable.

These and other objects of the invention are obtained in a fluid cutoff valve for use in fluid systems in which fluid is supplied to an environment from a fluid source via a pressure regulator comprising the disposition and control of an obturator or poppet body in a flow chamber which is located between the inlet and outlet of a valve housing such that the poppet body is seated upon the sensing of either an excess flow rate condition or an excess pressure condition downstream of the regulator. A bias spring, located within the poppet body, determines the pressure differential at which the poppet body is seated. The distance of the poppet body from the valve seat determines the flow rate at which the pressure differential is experienced. This distance can be adjusted in order to determine the flow rate at which the excess pressure drop is experienced. A spindle slidingly connects the poppet body to a sensing piston assembly which causes the seating of the poppet body upon the sensing of a predetermined excess pressure signal developed downstream of the pressure regulator.

BRIEF DESCRIPTION OF THE DRAWINGS

A more complete understanding of the invention and a fuller appreciation of the many attendent advantages, features and still other objects thereof will be readily observed by reference to the following detailed description when considered in connection with the accompanying drawings, wherein.

DESCRIPTION OF THE PREFERRED EMBODIMENT

Figure 1:
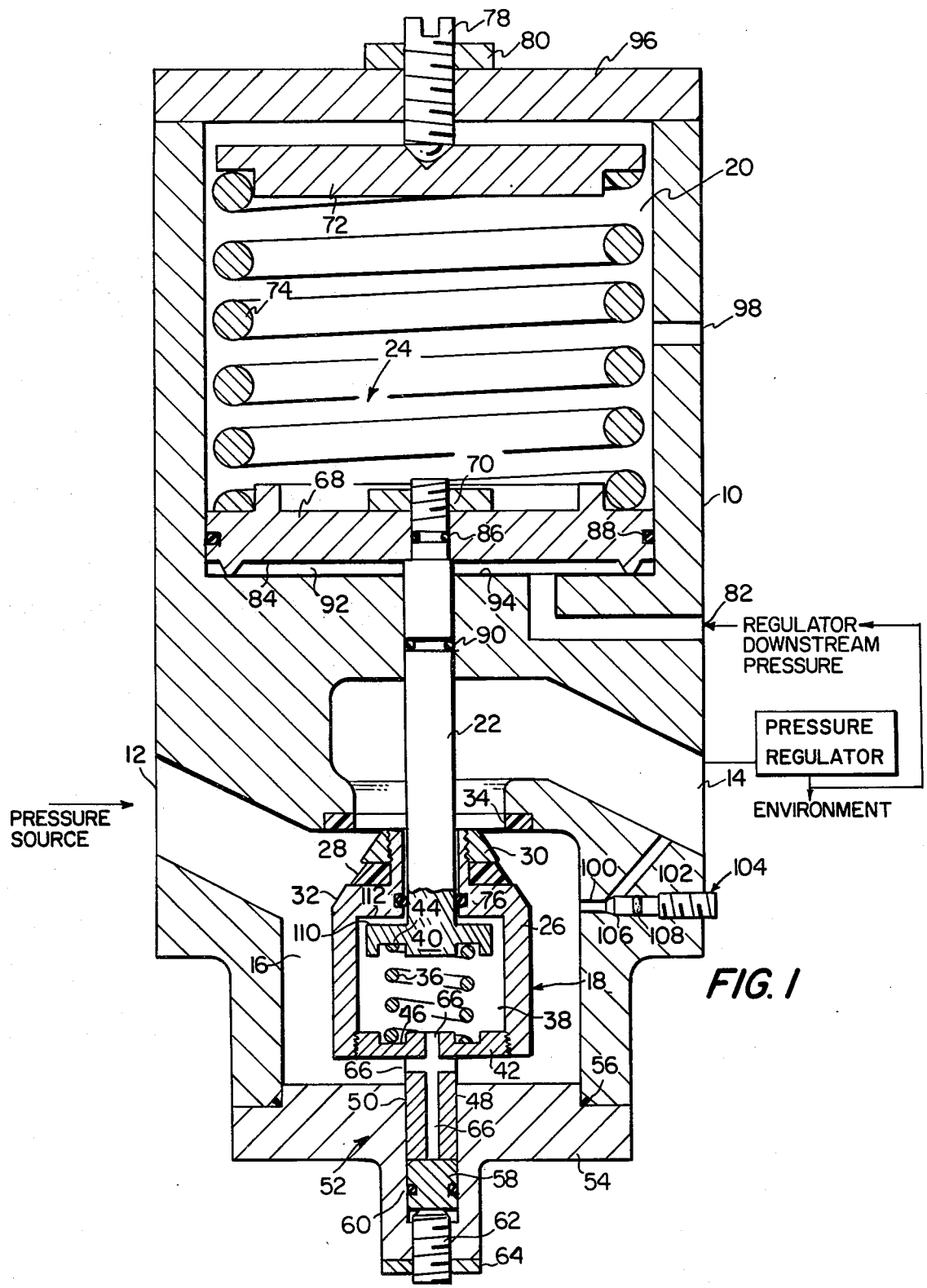
FIG. 1 is a sectional view of the present fluid cutout valve showing the cutout poppet body in the open or normal flow position.

Referring now to the drawings, wherein like reference characters designate identical or corresponding parts throughout the several views, and more particularly to FIG. 1 thereof wherein an embodiment of the present invention is shown in cross-section, and includes a valve housing 10 having an inlet 12 and an outlet 14. Disposed in a flow chamber 16, juxtaposed in housing 10 between inlet 12 and outlet 14, is a cutout obturator or poppet assembly 18 which is slidingly mounted on spindle 22. Located in a control piston housing or chamber 20 and connected to cutout poppet assembly 18 by spindle 22 is a sensing piston assembly 24.

Cutout poppet assembly 18 comprises a generally cylindrical hollow open-ended obturator or poppet body 26 having a resilient seating insert or seal 28 fixedly held in place by a seating insert retaining nut 30 which is on the outer extremity of the truncated cone surface 32 of poppet body 26. When the poppet body is seated or in the closed position, as shown in FIG. 2, seating insert 28 abuts seat 34 of the valve.

Figure 2:
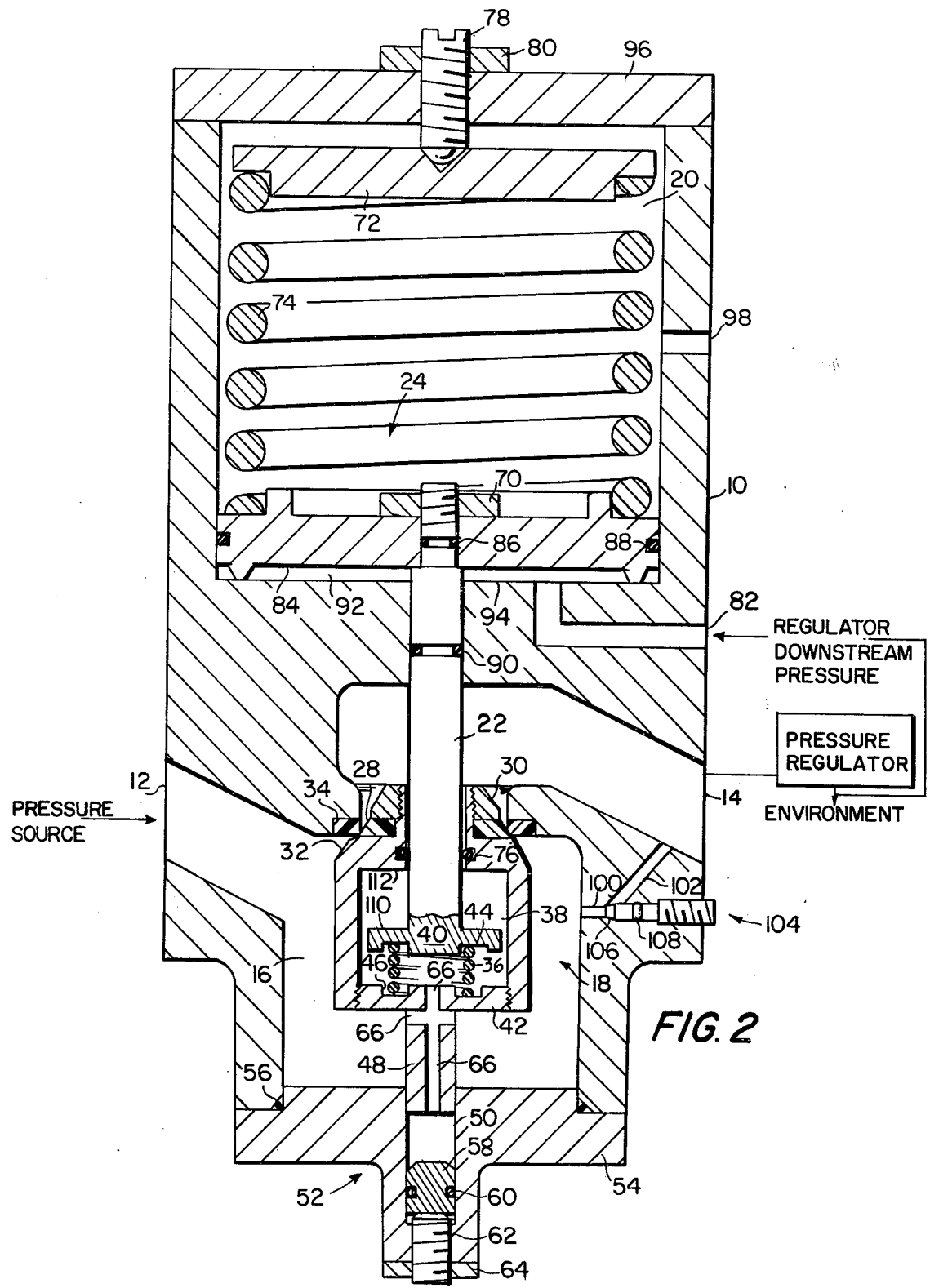
FIG. 2 is the instant valve shown in FIG. 1 with the cutout poppet body shown in the closed position in response to an excess flow condition.

With the poppet body 26 in the position shown in FIG. 1, and with fluid flowing from a source of fluid pressure to the inlet 12 and around the poppet body 26 in the valve chamber 16 to an environment where the fluid undergoes a controlled use, via the outlet passage 14, there is a pressure drop which urges the poppet body 26 toward a closed position or toward the seat 34, as shown in FIG. 2. The closing pressure force is opposed by a bias spring 36 located within a chamber 38, formed in poppet body 26. Spring 36 is compressed between the head 40 of spindle 22 and a threaded end plate 42 which closes off the open end of chamber 38. Circumferential grooves 44 and 46, located in head 40 and plate 42, respectively, maintain a fixed position for spring 36. A guide post 48 preferably intregal with end plate 42, rides in a guide bore 50 formed in a quill assembly 52 disposed in a bottom cover 54, attached to valve housing 10 and sealed by O-ring 56 and comprises the lower purchase for bias spring 36.

Quill assembly 52 comprises a quill or plug 58 having O-rings 60 and an adjusting screw 62 fixed by a lock nut 64. Quill assembly 52 constitutes an adjusting means for changing the rate of flow at which the valve operates. The amount of pressure drop around the poppet body 26 depends not only upon the rate of flow of the fluid passing through the valve but also upon the spacing of the poppet body 26 from the valve seat 34. If this spacing is reduced and the cross-section for the flow of fluid is subsequently cut down the pressure drop at a given rate of flow is thereby increased. It is possible therefore to change the rate of flow at which the pressure drop will be sufficient to overcome the force of bias spring 36 by changing the spacing of the poppet body 26 from seat 34. Control of the spacing is effected by turning the adjusting screw 62 so as to move it up or down in the threads formed in the bottom cover 54. When the screw 62 is turned in a direction to move it downward, the quill 58, guide post 48 and thus the poppet body 26 are displaced downward on spindle 22 by the bias spring 36 so that the truncated conical face 32 of the body 26 is further away from the seat 34. Conversely, the spacing of the poppet body 26 from the seat 34 can be decreased by turning the screw 62 so that it permits a compression of bias spring 36 to cause face 32 and thus insert 28 to be closer to seat 34.

As was mentioned, fluid enters the cutout valve via the inlet 12 and exits via outlet 14. A fluid passage network 66 prevents fluid entrappment which could impede the movement of the cutout poppet assembly. Passage network 66 also allows the inlet pressure to act under the cross-sectional area of the guide post 48 thereby insuring a more rapid closing of the poppet body.

The upper purchase for bias spring 36 is formed by head 40 of spindle 22 which is fixed to sensing piston assembly 24. The sensing piston assembly comprises a piston 68 attached to the end of spindle 22 by a threaded lock nut 70. Compressed between piston 68 and a spring plate 72 in a control spring 74 which biases piston 68 downward and thus helps to compress bias spring 36 inasmuch as spindle 22 freely reciprocates through poppet body 26 while it is sealed by an O-ring 76. Sensing piston assembly 24 is adjusted and preloaded by means of a control spring adjusting screw 78 which is fixed in a specified position by a lock nut 80.

Figure 3:
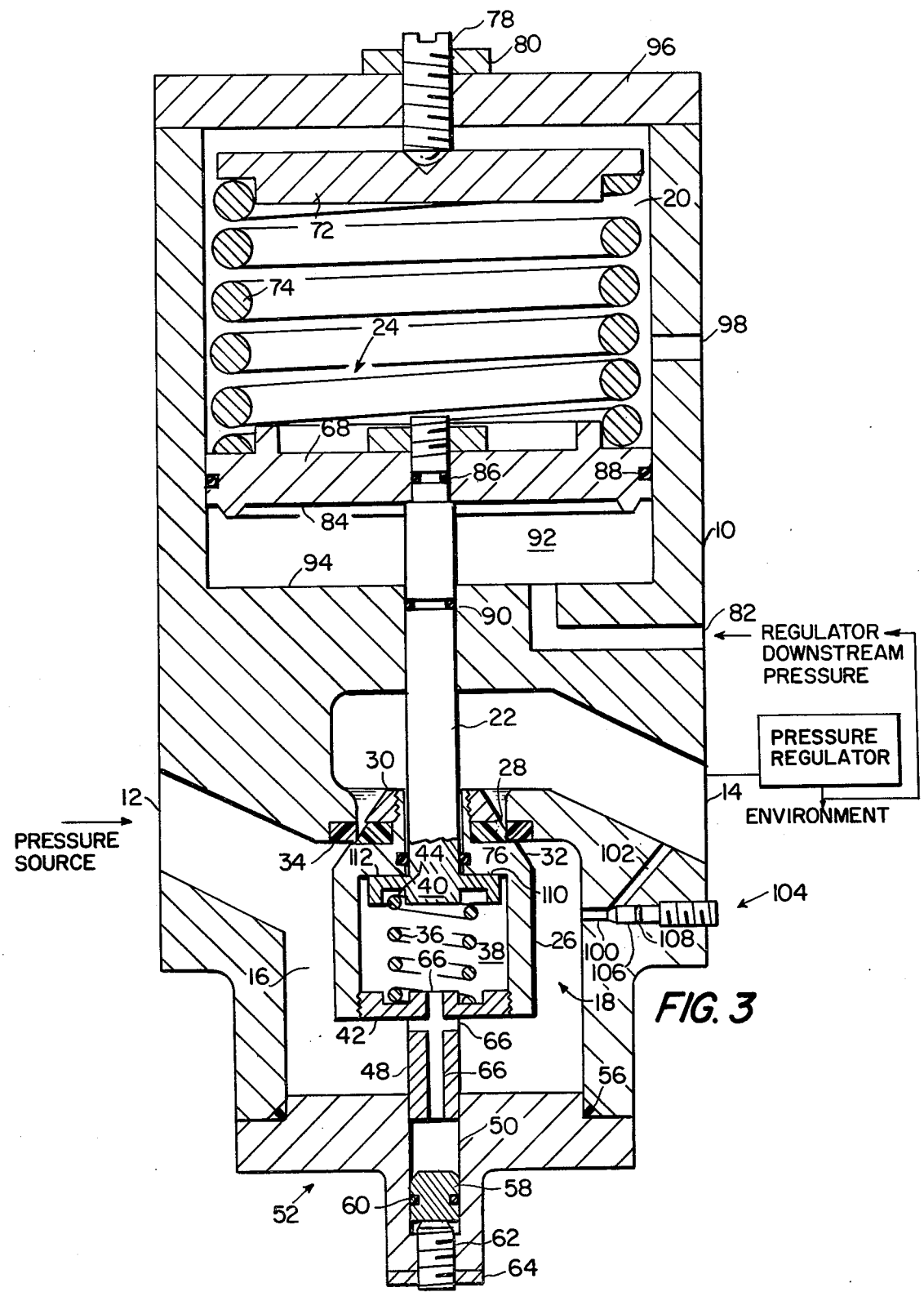
FIGS. 3 and 4 show the present valve with the cutout poppet body in the closed position in response to an excess pressure condition.
Figure 4:
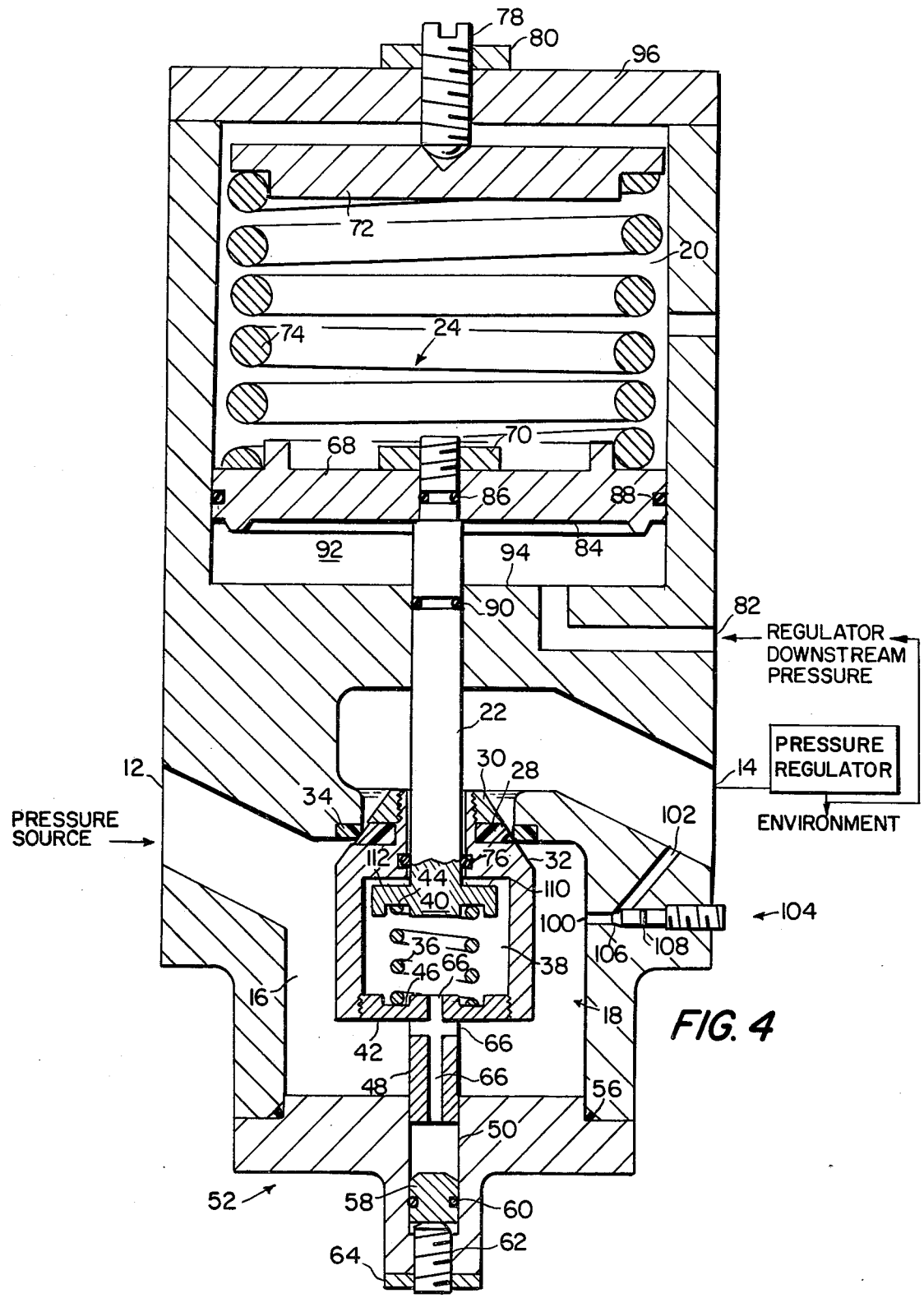

A feedback port 82, formed in valve body 10, permits the pressure from a remote downstream location of the fluid system, e.g. downstream of a pressure regulator, to be sensed by sensing piston assembly 24. Unduly high or excess pressure downstream of the pressure regulator acts on the undersurface 84 of piston 68 against the force of spring 74 tending to move piston 68 upwards as viewed in FIG. 1 and as shown in FIGS. 3 and 4. O-rings 86, 88, and 90 prevent the escape of high pressure fluid from an expansible chamber 92 formed between the piston 68 and the lower surface 94 of chamber 20. A top cover 96 closes the other end of chamber 20 and provides a support for adjusting screw 78 and lock nut 80. A vent port 98 prevents alteration of the cutout valve setting or pressure at which the piston 68 begins to move against spring 74, i.e., port 98 prevents an inadvertent pressure buildup within control piston chamber 20.

When there is pressure on the upstream side of a closed valve 10, i.e., when poppet body 18 is seated on seat 34 as shown in FIG. 2, it may be necessary to unlock the poppet body. One may release the valve from its closed position by equalizing the pressure on both sides of the poppet valve or at least by bringing the pressures on opposite sides of the poppet body near enough to a value which allows bias spring 36 to move poppet body 26 downwardly away from seat 34. Bypass passages 100 and 102, controlled by plug assembly 104, are thus provided thereby allowing a balancing pressure within the valve when the downstream portion of a fluid system is dead ended. Plug assembly 104 comprises a threaded plug or needle 106 and a sealing O-ring 108. The operation of assembly 104 is explained, infra.

In operation when the fluid cutout valve is in the normal position shown in FIG. 1, the cutout poppet assembly 18 is biased into an open position against the quill assembly 52 by the bias spring 36. Upstream fluid from a pressure source flows into the inlet 12 through the valve and out of outlet 14 to an environment thereby creating a pressure differential at the seating area which acts upon the net unbalanced cross-sectional area of the cutout poppet assembly 18. The cutout poppet assembly is thus urged upwards towards valve seat 34. No closing movement of the cutout poppet assembly 18 occurs until the net upward force on the assembly, created by the pressure drop, exceeds the preload downward force exerted by bias spring 36. When the preset threshold pressure drop occurs as a result of an excess flow condition, a closing movement of the cutout poppet assembly 18 commences and the cutout poppet assembly 18 will snap closed in an essentially instantaneous movement. This is due to the fact that the closure movement increases the pressure drop across the valve face 32 because it is closer to the valve seat which in turn accelerates the closure or closing movement thereby including a snowballing effect. The cutoff valve is shown in FIG. 2 in the completely closed position.

Closure of the cutout valve in response to an overpressure or excess pressure condition in the downstream fluid system, e.g., downstream of a pressure regulator, is initiated by a completely different sequence of events. In an overpressure closure event the flow rate through the valve is a relatively immaterial factor. Inasmuch as feedback port 82 communicates with expansible pressure chamber 92 and thus with sensing piston assembly 24, pressure in the fluid system downstream of the cutout valve is continuously sensed. When the downstream pressure rises above a level established by the preload imposed upon control spring 74 by adjusting screw 78 the sensing piston assembly begins to move upwardly as viewed in FIG. 3. This movement displaces spindle 22, which is fixed to the sensing piston assembly 24 until the lower shoulder 110 of head 40 abuts against the shoulder 112 of poppet body 26. This contact will move the cutout poppet assembly 18 upwardly toward valve seat 34. When the downstream fluid pressure has risen a predetermined amount the cutout poppet assembly 18 is forced into a closed position by the upward movement of the assembly 24 and spindle 22. Thus a pressure source can be isolated from an environment where the fluid experiences a controlled use.

Due to the fact that there is a fluid flow through the cutout valve during the time that the sensing piston assembly 24 begins to cause an upward movement of the cutout poppet assembly 18, the cutout poppet 18 will snap itself shut even before the upward movement, imposed by the sensing piston assembly 24, is completed. This phenomenon is shown in FIG. 4 and is caused by the ever increasing pressure drop created as the cutout poppet assembly 18 moves toward seat 34. It is made possible by the floating action of the cutout poppet assembly 18 on the spindle 22 as described supra. This self-initiating closure characteristic vastly improves the speed at which the cutout valve responds to an excess pressure condition compared to conventional solid-mounted poppet assemblies. This critical factor enormously improves the value and effectiveness of a valve of this type as a protective device in fluid systems.

As is clear, the threshold pressure differential at which the cutout poppet assembly 18 closes is established by the bias spring 36. However, a critical factor is the flow rate at which this threshold pressure drop occurs which is determined by the distance between the face 32 of the cutout poppet assembly 18 and seat 34. As was mentioned this distance can be adjusted by quill assembly 52. The amount which screw 62 is threaded into the bottom cover 54 determines the initial position of the cutout poppet assembly 18 relative to the valve seat 34 and thus the pressure differential at any given set of the inlet pressures and flow rate of the fluid which causes a closing of the valve.

Upon the closure of the valve due to an overpressure condition or an excess flow rate condition the cutout valve can be reopened or unlocked, after the fluid system has returned to a normal or ready state, by balancing the pressure across the cutout poppet assembly 18. A balancing pressure can be accomplished by opening plug assembly 104 to allow pressure to equalize across the cutout poppet assembly 18. Bias spring 36 can then force assembly 18 down to the full open position against the quill assembly 52. Plug assembly 104 is opened by unscrewing the plug or needle valve 106. After the pressure is balanced the needle valve 106 can be closed allowing the fluid cutout valve to be in an operative state.

Thus, what has been described is a fluid cutout valve which is capable of isolating a pressure source from an environment experiencing excess fluid pressure upon the occurrence of a regulator failure or excess fluid flow upon a loss of the integrity of the downstream system. Containment of the fluid at its source, being the safest conceivable solution, is accomplished in a self-contained valve requiring no electrical, hydraulic or other auxiliary inputs. The valve operates in a direct, certain and positive manner with response times controlled by fluid flow in the downstream system. Finally, cutout functions due to either an overpressure or excess flow condition occur independently without unfavorable mechanical interaction in a single, simply constructed valve.

Obviously numerous modifications and variations of the present invention are possible in the light of the above teachings. It is therefore to be understood that within the scope of the appended claims the invention may be practiced otherwise than as specifically described herein.

What is claimed and desired to be secured by Letters Patent of the United States is:

1. A fluid cutoff valve for stopping the flow of pressure fluid in a fluid system from a source of said fluid to an environment where said fluid is used, said system having means for regulating pressure disposed between said source and said environment, said valve comprising:
   a valve housing having an inlet and an outlet;
   a floating poppet body disposed in a flow chamber of said valve housing between said inlet and said outlet for stopping the flow of fluid when seated on a valve seat in said valve housing;
   means disposed in said valve housing for causing said poppet body to seat on said valve seat upon a preselected excess fluid flow rate and
   means disposed in said valve housing and responsive to said fluid pressure downstream of said means for regulating pressure for causing said poppet body to seat on said valve seat upon a preselected excess fluid pressure experienced downstream of said means for regulating pressure.

2. The valve of claim 1, wherein said excess flow rate means comprises:
   a reciprocable spindle slidingly fitted at its one end within said poppet body, said sindle having a head portion at said one end disposed within said poppet body;
   a compressible bias spring disposed within said poppet body for biasing said poppet body away from the seat of said valve, said head portion comprising a means for affixing and compressing said bias spring within said poppet body;
   said head portion being attached to said spindle and comprising the upper purchase for said bias spring;

whereby as fluid flows through said valve housing, the pressure drop across said poppet body tends to seat said poppet body against the force of compression of said bias spring so that when an excess flow rate condition is experienced in said valve housing said poppet body will be seated.

3. The valve of claim 2, wherein the lower purchase for said bias spring comprises:
an end plate threaded to a lower portion of said poppet body, said end plate having a circumferential groove for affixing said bias spring within said poppet body;
a guide post attached to said end plate and translatable in a guide bore formed in said valve housing;
a quill assembly disposed in said guide bore.

4. The valve of claim 3 wherein said quill assembly comprises a means for adjusting the distance of said poppet body from the seat of said valve whereby the flow rate at which the poppet body is seated can be adjusted.

5. The valve of claim 3, wherein said quill assembly comprises:
a quill displaceable within said guide bore;
a lockable screw for adjusting the relative location of said quill within said guide bore.

6. The valve of claim 3, wherein said guide post is provided with a fluid passage network which allows the pressure of the fluid experienced at said inlet to act under the cross-sectional area of said guide post thereby ensuring a more rapid closing of said poppet body.

7. The valve of claims 3 or 6 wherein said guide bore is disposed in a bottom cover of said valve housing.

8. The valve of claim 2, wherein said poppet body is provided with a truncated conical face, said conical face having, on its outer extremity, proximate the seat of said valve housing, a resilient seating insert, said seating insert being fixedly held in place by a seating insert retaining nut whereby when said poppet body is seated, said seating insert is compressed against said valve seat.

9. The valve of claim 2, wherein said excess fluid pressure means comprises:
a control piston chamber disposed in said valve housing;
a piston translatable within said control piston chamber and defining an expansible chamber portion betwen said piston and a wall of said piston chamber, said piston being attached to the other end of said spindle which projects from said flow chamber into said control piston chamber;
a compressible control spring for biasing said piston toward said wall; and
a feedback port communicating pressure downstream of said means for regulating pressure to said expansible chamber;
whereby when excess pressure is experienced downstream of said means for regulating pressure, said piston is forced, against the action of said control spring, away from said wall thereby causing said spindle to move said poppet body into a seated position.

10. The valve of claim 9, wherein said excess fluid pressure means is provided with means for adjusting the bias compression force of said control spring and thus increasing the amount of excess pressure required downstream of said means for regulating pressure which is necessary to actuate the excess fluid pressure means.

11. The valve of claim 10, wherein said control spring bias force adjusting means comprises:
a spring plate disposed in said control piston chamber, said control spring being compressed between said spring plate and said piston,
a lockable control spring adjusting screw which abuts said spring plate, said control spring adjusting screw being threaded in the top cover of said valve;
whereby said control spring adjusting screw can be turned to adjust the force of compression imposed on said control spring.

12. The valve of claim 9, wherein said control piston chamber is provided with a vent port which prevents inadvertent pressure buildup within said control piston housing.

13. The valve of claim 9, further comprising means for equalizing the pressure experienced at the inlet and the outlet when said poppet body is seated.

* * * * *